Jan. 29, 1952     L. W. PREMO     2,583,880
CLAMP
Filed Jan. 7, 1946     3 Sheets-Sheet 1
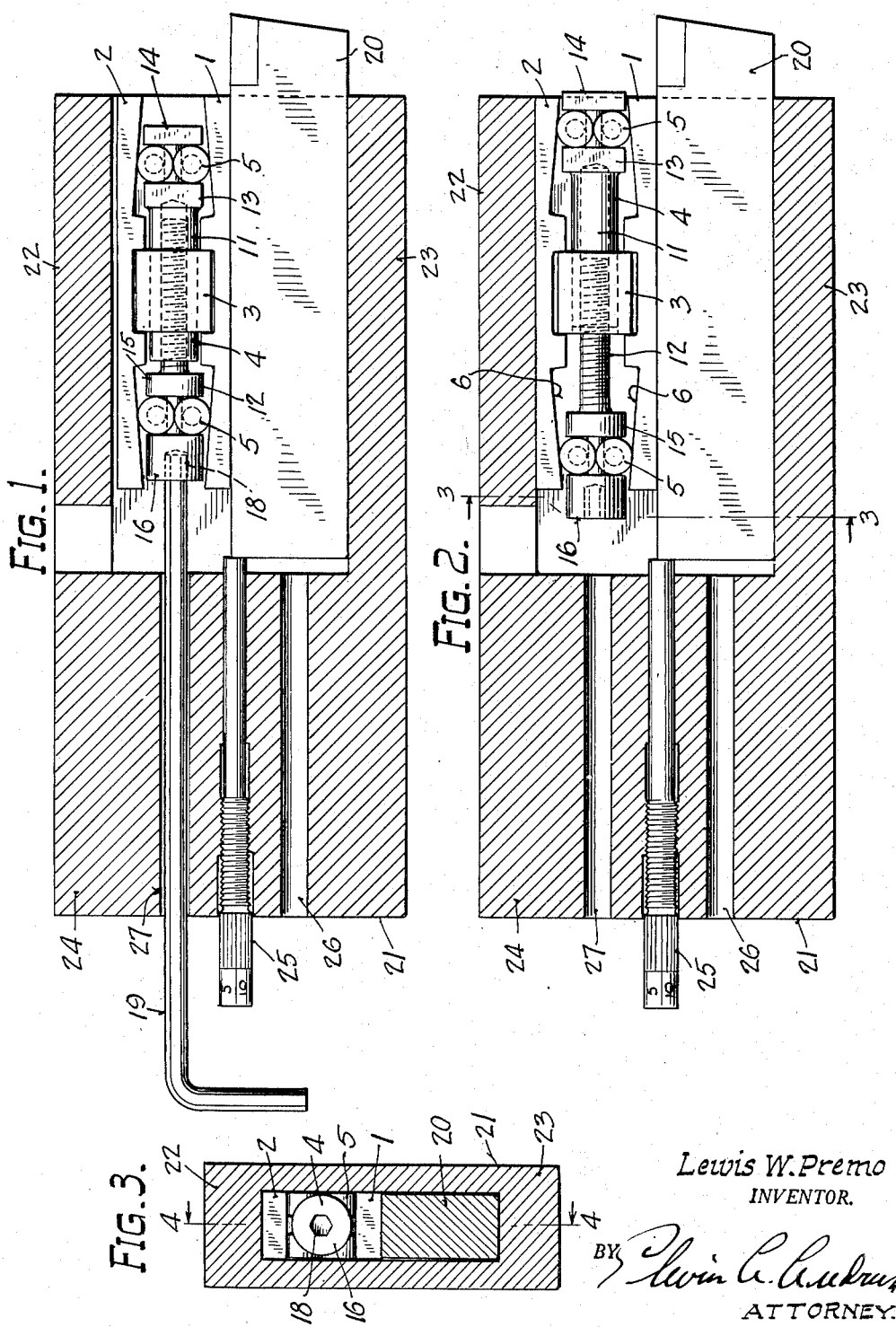
Lewis W. Premo
INVENTOR.
ATTORNEY.

Jan. 29, 1952 L. W. PREMO 2,583,880
CLAMP
Filed Jan. 7, 1946 3 Sheets-Sheet 2
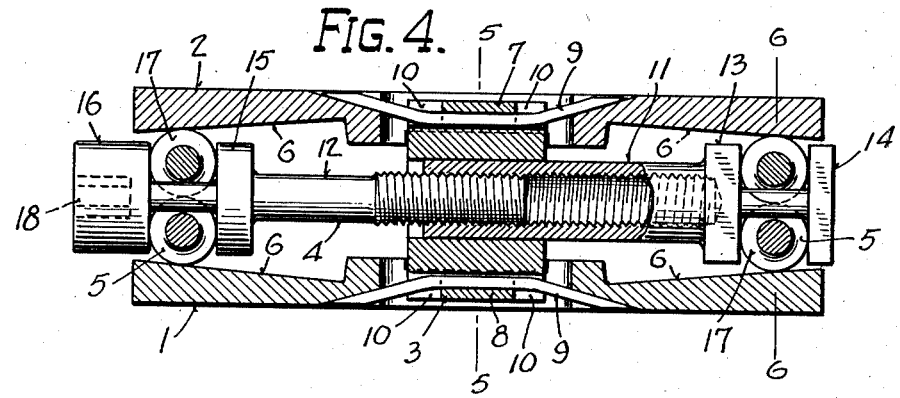
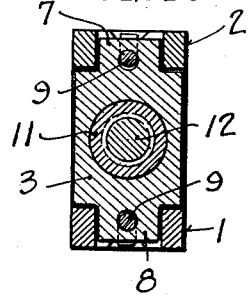 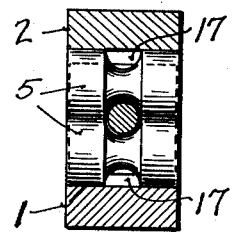
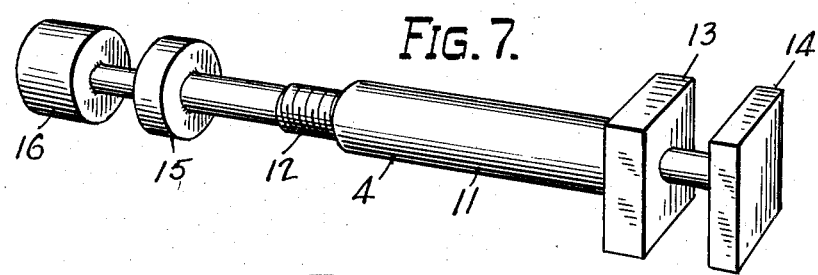
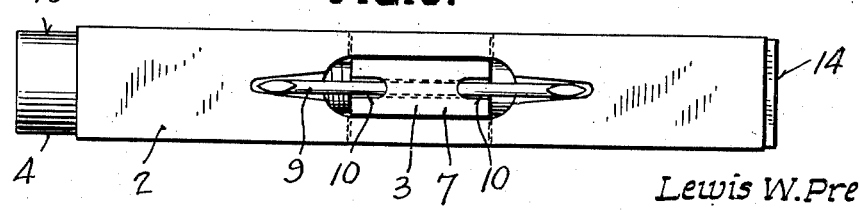
Lewis W. Premo
INVENTOR.
BY
ATTORNEY.

Jan. 29, 1952  L. W. PREMO  2,583,880
CLAMP
Filed Jan. 7, 1946  3 Sheets-Sheet 3

Lewis W. Premo
INVENTOR.

BY
ATTORNEY.

Patented Jan. 29, 1952

2,583,880

UNITED STATES PATENT OFFICE 2,583,880

CLAMP

Lewis W. Premo, Madison, Wis., assignor to Gisholt Machine Company, Madison, Wis., a corporation of Wisconsin Application January 7, 1946, Serial No. 639,619

4 Claims. (Cl. 189—36)

This invention relates to a tool clamp for use in clamping tools for lathes and the like.

An object of the invention is to provide a clamp which will more effectively clamp a cutting tool in a holder.

Another object of the invention is to eliminate the threaded studs generally employed to clamp a tool and avoid thread wear and strippage in tightening the tool in its holder.

Another object is to provide a greater mechanical advantage in a cutting tool clamp to more effectively secure the tool in the holder.

Another object is to provide a uniform and equalized clamping pressure throughout the length of the clamp.

Another object is to provide a compact clamp which readily fits along with a tool in a tool holder and enables the employment of tools side by side in a bridge without weakening of the bridge by the former customary threaded holes for studs.

Another object is to provide a tool clamp which may be operated more rapidly and save in set-up time.

Other objects and advantages are set forth in the description of an embodiment of the invention illustrated in the accompanying drawings.

In the drawing:

Figure 1 is a longitudinal section of a tool holder with a tool and tool clamp in elevation, the latter being in contracted position prior to tightening;

Fig. 2 is a view similar to Fig. 1 showing the tool clamp expanded to clamp the tool in the holder;

Fig. 3 is a transverse section taken on line 3—3 of Fig. 2, showing the clamp in end elevation;

Fig. 4 is an enlarged longitudinal vertical axial section of the clamp taken on line 4—4 of Fig. 3;

Fig. 5 is a transverse central section taken through the center of the clamp on line 5—5 of Fig. 4;

Fig. 6 is a transverse section taken through the rolls on line 6—6 of Fig. 4;

Fig. 7 is a perspective view of the central expander mandrel;

Fig. 8 is a top elevation of the clamp;

Figure 9:
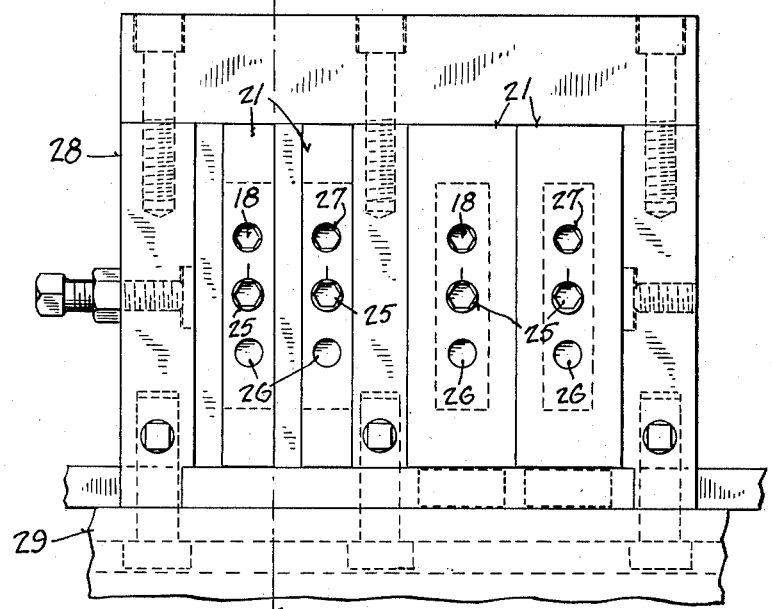
Fig. 9 is an end elevation showing a number of clamps employed in a bridge type tool holder.

The tool clamp comprises, in general, a lower cam block 1, an upper cam block 2, a central guide block 3, a central longitudinal expander mandrel 4 and two sets of rollers 5, one at each end.

The cam blocks 1 and 2 are flat on their outer surfaces to fit against the tool and the tool holder, and at least one of the cam blocks has its inner surface recessed on a taper between each end and a central body to provide a pair of opposed cam surfaces 6. The taper shown is from a maximum thickness at each end to a minimum thickness adjacent the central body. The central body of each cam block is recessed to receive the guide block 3 which holds the cam blocks against longitudinal displacement as they separate in clamping a tool.

The guide block 3 has a narrow upper projection 7 and a similar lower projection 8 each fitting into an opening in the corresponding cam block to prevent lateral displacement of the cam blocks.

The cam blocks 1 and 2 are secured to the corresponding projections 7 and 8 of the guide block by means of a curved spring wire 9 lying in a slanting recess in the outer surface of the corresponding cam block and extending through a longitudinal opening in the corresponding projection. The ends of the projections 7 and 8 are recessed at 10 for receiving the spring wire and allowing it to bend as the cam blocks move toward or away from each other in the operation of the clamp. The springs 9 constantly bias the cam blocks toward each other.

The expander mandrel 4 is made of two parts, one threaded into the other along the longitudinal axis of the mandrel. Each part of the mandrel carries a set of rolls 5 in a fixed longitudinal position relative thereto so that threading of the mandrel to telescope and contract it longitudinally brings the sets of rollers closer together and threading of the mandrel in the opposite direction separates the sets of rollers.

In the construction illustrated the mandrel 4 has a tubular member 11 threaded internally to receive the threaded solid cylindrical member 12, the tubular end 11 being adapted to move longitudinally in a central hole in the guide block 3.

The outer end of member 11 has a pair of flanges 13 and 14 spaced apart axially of the member to receive a set of rolls 5 therebetween and determine the longitudinal position of the rolls as the mandrel is contracted and expanded.

The outer end of the member 12 similarly has a pair of flanges 15 and 16 spaced apart axially of the member to receive a set of rolls 5 therebetween and determine the longitudinal position of the rolls as the mandrel is contracted and expanded.

The rolls 5 are cylindrical and each set has two rolls, one above the other to engage the tapered cam surfaces of the corresponding cam blocks. The rolls 5 have a circular circumferential groove 17 in the center for receiving the cylindrical stem of the corresponding mandrel member between the respective flanges.

The member 11 is held against turning while the outer end of member 12 is provided with a hexagonal axial recess 18 for receiving a wrench 19 for turning the same. Various ways may be provided for preventing member 11 from turning, that shown being to construct flanges 13 and 14 rectangular so that they loosely engage the cam blocks 1 and 2 and cannot rotate therebetween. The flanges 15 and 16 on member 12 are circular so that the member may be readily rotated.

In operation, rotation of member 12 in one direction threads the member into member 11 and causes the mandrel to contract longitudinally, thereby moving the sets of rollers 5 inwardly along the tapered cam surfaces of blocks 1 and 2 and allowing the latter to move inwardly under the biasing influence of springs 9.

When member 12 is rotated in the opposite direction to expand the mandrel longitudinally it forces the sets of rollers 5 outwardly along the cam surfaces of blocks 1 and 2 thereby forcing the latter to separate and move outwardly to effect a clamping operation.

The operation of the clamp is illustrated in Figures 1 and 2 in which the clamp is shown disposed on a tool 20 in a tool holder 21. Fig. 1 shows the clamp in contracted position after assembly and with its upper cam block 1 spaced from the top 22 of the holder. Fig. 2 shows the clamp in expanded position tightly engaging the tool 20 and the top 22 to clamp the tool against the bottom 23 of the holder. The sides of the tool holder 21 serve to hold flanges 13 and 14 against turning.

Fig. 3 shows the holder 21 with its top 22 and bottom 23, and with a tool 20 and clamp disposed therein. One end of the holder 21 is solid to constitute a head 24 and contains a micrometer screw 25 for adjusting the longitudinal position of the tool. The head 24 also has an opening 26 for driving the tool out by means of a punch, and an opening 27 for insertion of the wrench 19 for operating the clamp.

Figure 10:
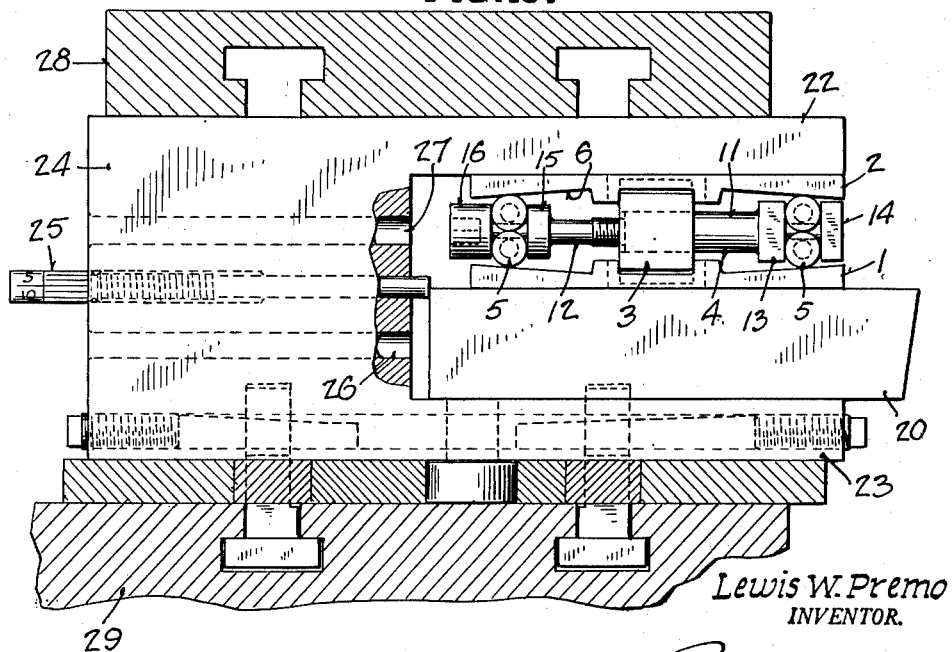
Fig. 10 is a longitudinal section taken on line 10—10 of Fig. 9.

The holder 21 with the tool 20 clamped therein constitutes a unit which may be secured to a tool bed of a lathe or machine in any suitable manner. In Figs. 9 and 10 a plurality of tool units 21 are shown mounted in a bridge type of holder 28 on a bed 29.

The clamp of the present invention may be employed in various ways in clamping tools. The clamping pressures applied are equalized between the ends of the clamp regardless of differences in the space involved. In tightening the clamp, where one end of the clamp tightens upon the tool first, cam action continues at the opposite end until the tightening forces are equalized.

The clamp is operated by a standard wrench from one end and does not require weakening of the tool or bridge by holes for bolts and the like. The clamp is compact and takes up about the same space as a standard tool, and will fit into most tool holders.

By providing two cam blocks, each with a pair of cam surfaces, the movement obtained for clamping is greater without stressing of the mandrel by a tendency of the rollers to tilt. By providing a pair of aligned rollers at each end the friction is reduced by the rollers rolling upon the cam surfaces and upon each other.

The invention may have various embodiments within the scope of the accompanying claims.

I claim:

1. A clamp of the class described comprising a cam block having its opposite ends tapered longitudinally to provide opposed cam surfaces on its inner surface, a corresponding block extending substantially parallel to said cam block and facing said cam surfaces, means securing said blocks in spaced superimposed relation subject to relative movement of the blocks toward and away from each other to effect clamping operations, a pair of solid double rollers disposed between said blocks at each end thereof in engagement with the corresponding inner surfaces of the blocks and with each other to determine the space between the blocks, abutment means ahead and behind each set of rollers to retain the rollers in superimposed relation and in adjusted position longitudinally of the blocks, and means to adjust the position of each abutment means and the corresponding set of rollers longitudinally of the blocks to determine the separation of the blocks.

2. A clamp of the class described comprising a pair of spaced parallel blocks movable away from and toward each other to effect clamping and unclamping operations, respectively, a guide block interposed between said clamping blocks and adapted to secure said clamping blocks against relative lateral and longitudinal displacement during movement of the blocks, said guide block having a central projection entering a corresponding hole in one of said clamping blocks, and a flexible spring member extending through said projection and engaging the back side of the clamping block to bias the latter toward the opposite clamping block.

3. A clamp of the class described comprising a pair of spaced parallel blocks movable away from and toward each other to effect clamping and unclamping operations, respectively, a guide block interposed between said clamping blocks and adapted to secure said clamping blocks against relative lateral and longitudinal displacement during movement of the blocks, said guide block being separate from said clamping blocks and floating therebetween with the guide block entering corresponding recesses in each clamping block, and a spring clip extending through each end of the guide block and lying in a recess in the back side of the corresponding clamping block to bias the latter toward the opposite clamping block.

4. A clamp of the class described comprising a pair of vertically spaced clamping blocks having inner opposite inclined surfaces at each end to constitute opposed cams, a guide block interposed between said clamping blocks, spring means carried by said guide block and clamping blocks and biasing said cam blocks toward each other, double rollers disposed between said cam blocks at each end in engagement with each other and with the inner cam surfaces of the blocks and serving to hold them apart, and a mandrel disposed longitudinally of and between said cam blocks and passing through said guide block for moving said double rollers relative to each other to actuate the clamp, said rollers supporting said mandrel and said guide block and the latter securing said mandrel and rollers against lateral displacement.

LEWIS W. PREMO.

REFERENCES CITED

The following references are of record in the file of this patent:

UNITED STATES PATENTS

| Number | Name | Date |
|---|---|---|
| 194,582 | Cole | Aug. 28, 1877 |
| 273,894 | Reeves | Mar. 13, 1883 |
| 383,035 | Bell | May 15, 1888 |
| 447,667 | Dubrule | Mar. 3, 1891 |
| 744,362 | Kondolf | Nov. 17, 1903 |
| 1,400,491 | Mechling | Dec. 13, 1921 |
| 1,804,843 | Santiago | May 12, 1931 |
| 2,028,890 | Baker | Jan. 28, 1936 |
| 2,226,078 | Spann | Dec. 24, 1940 |
| 2,382,911 | Pringle | Aug. 14, 1945 |